United States Patent [19]

Grossoleil et al.

[11] Patent Number: 4,835,236

[45] Date of Patent: May 30, 1989

[54] VINYL CHLORIDE AND NONCONJUGATED DIENE COPOLYMER

[75] Inventors: Jacques Grossoleil, Orthez; Patrick Kappler, Ecully; Nicolas Krantz, Bernay, all of France

[73] Assignee: Atochem, France

[21] Appl. No.: 1,618

[22] Filed: Jan. 9, 1987

[30] Foreign Application Priority Data

Jan. 22, 1986 [FR] France ............................. 86 00876
Oct. 15, 1986 [FR] France ............................. 86 14319

[51] Int. Cl.$^4$ ............................................. C08F 36/20
[52] U.S. Cl. ........................................ 526/345; 526/75
[58] Field of Search ............................................ 526/345

[56] References Cited

U.S. PATENT DOCUMENTS

| | | | |
|---|---|---|---|
| 2,354,775 | 8/1944 | Rummelsburg | 526/345 |
| 3,025,280 | 3/1962 | Martin | 526/334 |
| 3,029,231 | 4/1962 | von Amerongen | 526/345 |
| 4,014,836 | 3/1977 | Kraft | 526/345 |

FOREIGN PATENT DOCUMENTS 7000830 8/1970 Netherlands.

Primary Examiner—Christopher Henderson
Attorney, Agent, or Firm—Sigalos, Levine & Montgomery

[57] ABSTRACT

The present invention comprises a vinyl chloride copolymer consisting essentially of the copolymerization reaction product of a vinyl chloride monomer composition and at least one polyfunctional compound; said polyfunctional compound being an alkadiene of the formula:

$$CH_2=CH-(CH_2)_x-CH=CH_2$$

in which x is a whole number from 1 to 25; said copolymer containing, in moles, from 99 to 99.99% of said monomer composition based on vinyl chloride and correspondingly from 0.01 to 1% of said polyfunctional compound and the process of making such copolymer.

3 Claims, No Drawings

VINYL CHLORIDE AND NONCONJUGATED DIENE COPOLYMER

BACKGROUND OF THE INENTION

The present invention concerns copolymers of vinyl chloride and the process of making said copolymers.

It is know to prepare polymers of vinyl chloride of high molecular weight by polymerization at temperatures below 40° C. However, polymerization at such a low temperature involves difficulties of thermal regulation, necessitating the use of a cooling apparatus.

As discussed herein, the molecular weight of a polymer of vinyl chloride is obtained from its viscosity index determined according to international standard ISO 174.

It has been proposed to prepare copolymers of vinyl chloride of high molecular weight by the polymerization of vinyl chloride at a temperature equal to or above 40° C. in the presence of a polyfunctional compound. As used herein, the term "polyfunctional compound" means a compound whose molecule includes at least two ethylene double bonds. Numerous polyfunctional compounds have been utilized such as, for instance, diallyl phthalate, diallyl oxalate, diallyl sulfide, diallyl ether, diallyl maleate, triallyl phosphate, divinyl ether, polyalkylene glycol dimethacrylate, polyether glycol dimethacrylate, and polyester glyco dimethacrylate. However, the copolymers obtained have a weight percentage of insoluble matter in tetrahydrofuran which is generally above 10% and can reach 80%, rending their use difficult. At a polymerization temperature equal to or above 40° C., with the help of polyfunctional compounds used up to the present time, it is especially not possible to obtain copolymers of vinyl chloride exhibiting at the same time a viscosity index above 250 ml/g and a weight percentage of matter insoluble in tetrahydrofuran below 5%.

SUMMARY OF THE INVENTION

The vinyl chloride copolymers, which are the object of the invetion, include a monomer composition based on vinyl chloride and at least one polyfunctional compound other than those conventionally used up to the present time.

Briefly, the present invention comprises a vinyl chloride copolymer consisting essentially of the copolymerization reaction product of a vinyl chloride monomer composition and at least one polyfunctional compound; said polyfunctional compound being an alkadiene of the formula:

in which x is a whole number from 1 to 25; said copolymer containing, in moles, from 99 to 99.99% of said vinyl chloride monomer composition and correspondingly from 0.01 to 1% of said polyfunctional compound.

The invention also comprises the process of making such copoylmers as hereinafter described.

DETAILED DESCRIPTION

As used herein, the phrase "vinyl chloride monomer compostion" or, more briefly, "monomer composition" means vinyl chloride alone or in mixture with at least one other monomer copolymerizable with vinly chloride, exculsuive of any polyfunctional compound. Said monomer composition contains at least 50% by weight of vinyl chloride. The copolymerizable monomers are those generally empoyed in the standard techniques of copolymerization of vinyl chloride. One can cite the vinyl esters of mono- and poly- carboxylic acids, such as vinyl acetate, propionate benzoate; unsaturated mono- and poly- carboxylic acids, such as acrylic, methacrylic, maleic, fumaric, itaconic acids, as well as their aliphatic, cycloaliphatic, aromatic esters, their amides, their nitriles; the allyl, vinyl, vinylidene halides; the alkylvinylethers; the olefins.

Also, as used herein, a polymer of vinyl chloride "corresponding" to copolymer according to the inventon means any polymer of vinyl chloride which exculsively comprises the same monomer compositon as the one of said copolymer according to the invention and, optionally, at least one polyfunctional compound selected as desired from those now commonly used.

One goal of the invention is to produce vinly chloride copolymers presenting a viscosity index above the viscosity index of the corresponding vinyl chloride polymers prepared at the same or lower polymerization temperature.

Another goal of the invention is a process making it possible to prepare, at the same or higher polymerization temperature, vinyl chloride copolymers having a viscosity index above the one of the corresponding vinyl chloride polymers.

Another goal of the inventoin is a process making it possible to prepare vinyl chloride copolymers exhibiting at the same time a weight ratio of matter insoluble in tetrahydrofuran below 5% and a viscosity index which, at a polymerization temperture of 45° C., is above 250 ml/g and, at a polymerization temperature of 40° C., is above 270 ml/g.

Other goals and advantages of the invention will be apparent from the description herein.

According to the invention, the polyfunctional compound is an alkadiene of the formula:

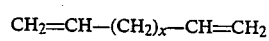

in which x is a whole number from 1 to 25.

According to the invention, the vinyl chloride copolymers include, in moles, from 99 to 99.99% and, preferably, from 99.5 to 99.99% of said monomer composition based on vinyl chloride and from 0.01 to 1% and, preferably, from 0.01 to 0.5% of said polyfunctional compound.

Preferentially, the polyfunctional compound is 1,9-decadiene.

According to the process of preparing such vinyl chloride copolymers, one carries out a radical polymerization of from 99 to 99.99% and, preferably from 99.5 to 99.99% in moles of a vinyl chloride monomer composition and from 0.01 to 1% and, preferably, from 0.01 to 0.5% in moles of at least one alkadiene of the formula:

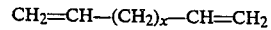

in which x is a whole number from 1 to 25.

The term "radical polymerization" as used herein means a polymerizatoin in the presence of a polymerization initiator generating free radicals.

The polymerization temperature generally is between 30° and 70° C. and, preferably, between 35° and 55° C.

Any known radical polymerization technique usually used for the preparation of polymers of vinly chloride, such as polymerization is suspension, in bulk, in emulsion, or in microsuspension, can be utilized to carry out the process of the invention and expecially polymersization in suspension.

The alkadiene can be added at the start of polymerization and/or during the course of polymerization, before the polymer formed represents 20% by weight of the total polymer plus monomer or monomers. It can be added at one time, or intermittently by successive fractions, or continuously.

A means of preparing a vinyl chloride copolymer according to the invention, by polymerization in suspension, comprises using a reaction mixture including water, a vinyl chloride monomer composition, the alkadiene, a stabilizing agent, and at least one organosoluble polymerization initiator. The quantity of water to be used is such that the initial monomer content is generally between 30 and 50% by weight with respect to the reaction mixture. The reaction mixture, subjected to agitation, is heated under autogenic pressure and kept at the selected polymerization temperature. Afther pressure drop, the reaction is stopped and the unconverted monomer or monomers are removed by degasifing the reactor.

The stabilization agents used are those conventionally used in the polymerization in suspension of vinyl chloride such as, for instance, polyvinyl alcohol, the methylcelluloses, the carboxycelluloses, or the gelatins. They are used in a quantity generally between 0.05 and 1% by weight with respect to the monomers used.

The organosoluble polymerization initiators can be those usually used in the polymerization in suspension of vinyl chloride, such as organic peroxides like lauroyl peroxide, benzoyl peroxide, acetylcyclohexanesulfonyl peroxide, isobutyroyl peroxide, dichloroacetyl peroxide, trichloroacetyl peroxide, and peroxydicarbonates like ethyl peroxydicarbonate, ethyl hexyl peroxydicarbonate, isopropyl peroxydicarbonate, isobuty peroxydicarbonate, dicetyl peroxydicarbonate; tert.-butyl permethoxyacetate; tert.-butyl perethoxyacetate; ter.-butyl perphenoxy-2-propionate. One generally uses 0.001 to 0.006% by weight, with respect to the monomers used, of initiator or initiatiors expressed in active oxygen.

The vinyl chloride copolymers of the present invention, prepared by the suspension polymerization technique, can be separated from the polymerization medium by any known conventional technique such as filtration, removal by suction, centrifuge decantation, then subjected to a drying operation, generally followed by a screening operation destined to isolate the heavy product defined as passing through a sieve of given mes opening.

A method of preparing a copolymer of vinyl chloride according to the invention, by polymerization in bulk, comprises using a vinyl chloride monomer composition, the alkadiene and at least one organosoluble polymerization initiator and of carrying out the polymerization in two stages; each carried out in a different apparatus with the first stage under agitation of high turbulence until a degree of conversion of the emonomer or monomers of 3 to 15% is obtained, and the second stage under a speed of slow agitation. To the monomer/polymer compositon coming from the first stage, one can add a supplementary vinyl chloride monomer composition, which is identical to or different from the one used during the first stage and one or several polymerization initiators. The two stages, called "prepolymerization" for the first stage and "final" polymerization for the second stage, take place in suitable conventional apparatus known as prepolymerizers and polymerizers. At the end of the second stage, the reaction is stopped and the unconverted monomer or monomers are removed.

The organosoluble polymerization initiators can be those conventionally used in the bulk polymerization of vinyl chloride, such as organic peroxides like lauroyl peroxide, benzoyl peroxide, acetylcyclhohexanesulfonyl peroxide, isobutyroyl peroxide, dichloroacetyl peroxide, trichloroacetyl peroxide; peroxydicarbonates like ethyl peroxdicarbonate, ethyl hexyl peroxydicarbonate, isopropyl peroxydicarbonate, isobutyl peroxydicarbonate, dicetyl peroxydicarbonate; tert.-butyl permethoxyacetate, tert.-butyl perethoxyacetate; tert.-butyl perphenoxy-2-propoinate. One generally uses 0.001 to 0.006% by weight, with respect to the monomers used, of initiator or initiatiors expressed in active oxygen.

After degasification of the unconverted monomer or monomers, the copolymers of vinyl chloride of the invention, prepared by the mass polymerization technique, are generally subjected to a screening operation destined to isolate the heavy product defined as passing through a sieve of given mesh opening.

The vinyl chloride copolymers of the invention can be used in place of the corresponding vinyl chloride polymers in all industrial applications. They are especially applicable to the production of sheets, films, electric cables, hollow bodies, cellular materials, articles molded by the techniques of calendering, extrusion, blow-molding, injection molding as well as to the production of coating on articles and articles made by all techniques for the use of plastisols and organosols such as coatings, spin molding, dripping or spraying. The copolymers according to the invention prepared by suspension polymerization are especially utilizable as filler resins for the preparation of plastisols and organosols. The copoylmers according to the invention having a viscosity index above 200 ml/g permit obtaining articles exhibiting a dull surface appearance.

The invention will be further described in connection with the following examples which are set forth for purposes of illustration only. In Examples 1 to 15, the polymers are prepared by suspension polymerization; and in Examples 16 to 19, the polymers are prepared by bulk polymerization.

Examples 1, 5, 8, 10, 12, 13, 14, 15, and 16 are given by way of comparison and Examples 2, 3, 4, 6, 7, 9, 11, 17, 18, and 19 are according to the invention.

For each example the heavy product is defined as passing through a sieve having a mesh opening of 315 $\mu$m and the weight ratio of the matter insoluble in tetrahydrofuran of a polymer to be examined is determined by means of the following method:

Into a Soxhlet extractor of 60 ml capacity one introduces a weigh (Po) of about 1.5 of polymer to be examined. Into an Erlenmeyer flask of 500 ml capacity associated with the Soxhlet extractor one introduces 250 ml of tetrahydrofuran and, in order to avoid the formation of peroxide, 0.2 mg of hydroquinone. The tetrahydrofuran is heated with refluxing for 48 hours so as to achieve an extraction every 4 minutes. After extraction, half of the tetrahydrofuran is eliminated with the help of a rotating evaporator and then the fraction of the polymer dissolved in the tetrahydrofuran (called "fraction of polymer soluble in tetrahydrofuran") is precipitated in 300 ml of methanol. One recovers said fraction of the polymer on fritted glass No. 4, dries it in the drying oven at 50° C. for 2 hours, then in a dissicator under vacuum for 12 hours, and then determines its weight (P). The weight ratio of matter insoluble in tetra hydrofuran is given by the ratio Po-P/Po expressed as a percentage.

The viscosity index of a polymer to be examined is determined according to international standard ISO 174 on the fraction of the polymer soluble in tetrahydrofuran, after solution in the tetrahydrofuran, precipitation in methanol, recovery and drying of said fraction under the conditions indicated above.

EXAMPLE 1 to 15

12 kg or water and 10.4 g of polyvinyl alcohol were introduced into a reactor made of stainless steel, of a capacity of 25 liters, equipped with an agitator of the "Pfaudler" type.

After regulation of the speed of agitation to 330 RPM, placement of a temperature at 30° C., closing the reactor and placing it under vacuum, there was introduced into the reactor 8 g of dicetyl peroxydicarbonate, 7 kg of vinyl chloride and, where used, the quantity of vinyl acetate indicated for each example in Tables I and II.

In Examples 1, 5, 8 and 10 no polyfunctional compound was added.

In Examples 2, 3, 6, 7, 9, 11, 12, 13, 14 and 15 there was added the quantity of polyfunctional compound indicated, for each example, in Tables I and II.

In Examples 2, 3, 6, 7, 9 and 11 the polyfunctional compound used was 1, 9-decadiene.

In Examples 12, 13, 14 and 15 the polyfunctional compound used was diallyl phthalate.

The reaction temperature was raised to the selected polymerization temperature and this temperature was maintained for the duration of polymerization.

In Example 4, when the polymer formed represents 5 and then 10% by weight of the total polymer plus monomer or monomers; one respectively introduces one half and then the other half of the quantity of the polyfunctional compound, 1,9-decadiene, indicated in Table I.

When a pressure drop of 1 bar was observed, the polymerization was considered as terminated. The monomer or monomers which have not reacted were then degasified and the polymer obtained separated from the polymerization medium by removal by suction and drying and then the heavy product isolated by sifting.

Tables I and II likewise indicate for each example:
(i) the polymerization temperature,
(ii) the polymerization duration,
(iii) the degree of conversion of the total quantity fo monomers, and
(iv) the weight ratio of heavy product, as well, determined on the heavy product,
(i) the viscosity index, and
(ii) the weight ratio matter insoluble in tetrahydrofuran.

TABLE I

|  | Comparative example 1 | Example according to the invention 2 | Example according to the invention 3 | Example according to the invention 4 | Comparative example 5 | Example according to the invention 6 | Example according to the invention 7 |
|---|---|---|---|---|---|---|---|
| Vinyl acetate (g) | — | — | — | — | — | — | — |
| 1,9-decadiene (g) | — | 9.1 | 9.5 | 11.2 | — | 14.0 | 15.8 |
| Polymerization temperature (°C.) | 45 | 45 | 45 | 45 | 52 | 52 | 52 |
| Polymerization duration (h) | 11 | 12 | 12 | 12 | 8 | 9 | 9 |
| Degree of conversion (%) | 80 | 84 | 80 | 83 | 72 | 86 | 79 |
| Weight ratio of heavy product (%) | 97 | 98 | 98 | 98 | 98 | 99 | 98 |
| Viscosity index (ml/g) | 165 | 255 | 260 | 260 | 125 | 210 | 210 |
| Weight ratio of matter insoluble in tetrahydrofuran (%) | 1 | 3 | 3 | 4 | 0 | 3 | 5 |

TABLE II

|  | Comparative example 8 | Example according to the invention 9 | Comparative example 10 | Example according the invention 11 | Comparative example 12 | Comparative example 13 | Comparative example 14 | Comparative example 15 |
|---|---|---|---|---|---|---|---|---|
| Vinyl acetate (g) | 210 | 210 | — | — | — | — | — | — |
| 1,9-decadiene (g) | — | 10.5 | — | 7.0 | — | — | — | — |
| Diallyl phthalate (g) | — | — | — | — | 7.0 | 7.0 | 8.4 | 12.6 |
| Polymerization temperature (°C.) | 45 | 45 | 40 | 40 | 43 | 40 | 40 | 40 |
| Polymerization duration (h) | 10 | 13 | 17 | 19 | 12 | 16 | 16 | 16 |
| Degree of conversion (%) | 84 | 84 | 80 | 79 | 76 | 80 | 81 | 80 |
| Weight ratio of heavy product (%) | 97 | 99 | 97 | 95 | 97 | 95 | 92 | 88 |
| Viscosity index (ml/g) | 165 | 255 | 180 | 280 | 220 | 235 | 225 | 200 |

TABLE II-continued

| | Comparative example 8 | Example according to the invention 9 | Comparative example 10 | Example according the invention 11 | Comparative example 12 | Comparative example 13 | Comparative example 14 | Comparative example 15 |
|---|---|---|---|---|---|---|---|---|
| Weight ratio of matter insoluble in tetrahydrofuran (%) | 1 | 4 | 1 | 4 | 5 | 4 | 10 | 40 |

From tables I and II it can be seen that:

(i) the copolymers of vinyl chloride prepared in the examples according to the invention exhibit a viscosity index above that of corresponding polymers prepared at a polymerization temperature which is equal or, in some cases, below, in the comparative examples;

(ii) the copolymer of vinyl chloride prepared at a polymerization temperature of 45° C. in Example 3 according to the invention has a viscosity index of 260 ml/g and a weight ratio of matter insoluble in tetrahydrofuran of only 3%;

(iii) the copolymer of vinyl chloride prepared at a polymerization temperature of 40° C. in Example 11 according to the invention has a viscosity index of 280 ml/g and a weight ratio of matter insoluble in tetrahydrofuran of only 4%; and (iv) the copolymer of vinyl chloride; prepared at a polymerization temperature of 40° C. in Example 11 according to the invention, at the same time has a higher viscosity index and a weight ratio of matter insoluble in tetrahydrofuran which is lower or at the most equal to the one of the corresponding polymers prepared at the same polymerization temperature in comparative Examples 13, 14 and 15.

EXAMPLES 16 TO 19

Into a prepolymerizer of 16 liters caacity, made of stainless steel, equipped with an agitator constituted of a turbine of the "Lightnin" type, there was added 8 kg of vinyl chloride and the apparatus purged by degassing with 0.8 kg of vinyl chloride. Also introduced were 3 g of ethyl hexyl peroxydicarbonate and, where used, the quantity of 1,9-decadiene indicated for each example in the table below. The agitation speed was regulated at 700 RPM.

The reaction medium was raised to a temperature of 70° C. and this temperature maintained for the duration of prepolymerization.

After 15 minutes of prepolymerization, with the degree of conversion of the monomer or monomers being close to 7%, the prepolymerizate was transferred into a double-jacketed vertical polymerizer of 25 liters capacity, made of stainless steel and previously purged by degassing of 0.2 kg of vinyl chloride and containing 4.2 kg of vinyl chloride, 2 g of acetylcyclhoexane-sulfonyl peroxide and 4.5 g of ethyl hexyl peroxydicarbonate. Where used, there is introduced into the polymerizer the quantity of 1,9-decadiene indicated for each example in the table below. The polymerizer is equipped with an agitator composed of a ribbon formed in helicoidal turns on a rotating shaft traversing the upper part of the polymerizer according to its axis and at its lower extremity fixedly connected to an arm following the shape of the dome-shaped bottom of the polymerizer. The agitation speed is regulated at 70 RPM.

The temperature of the reaction medium was raised to 56° C. and this temperature maintained for the duration of polymerization.

After polymerization and degassing of the monomer or monomers which had not reacted, the heavy product was isolated by sifting.

Table III, below, likewise indicates for each example:
(i) the duration of polymerization in the polymerizer;
(ii) the degree of conversion of all of the monomers as a whole; and
(iv) the weight ratio of heavy producy, as well, determined on the heavy product,
(i) the viscosity index, and
(ii) the weight ratio of matter insoluble in tetrahydrofuran.

TABLE III

| | Comparative Example 16 | Example according to the invention 17 | Example according to the invention 18 | Example according to the invention 19 |
|---|---|---|---|---|
| 1,9-decadiene introduced into the prepolymerizer (g) | — | 34.2 | — | — |
| 1,9-decadiene introduced into the polymerizer (g) | — | — | 28.5 | 34.2 |
| Polymerization duration in the polymerizer (h) | 3.5 | 4 | 4 | 4 |
| Degree of conversion (%) | 77 | 74 | 69 | 72 |
| Weight ratio of heavy product (%) | 94 | 95 | 88 | 90 |
| Viscosity index (ml/g) | 108 | 203 | 172 | 185 |
| Weight ratio of matter insoluble in tetrahydrofuran (%) | 0 | 4 | 1 | 2 |

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claim is:

1. A vinyl chloride copolymer consisting essentially of the copolymerization reaction product of a vinyl chloride monomer composition and at least one polyfunctional compond; said polyfunctional compound being an alkadiene of the formula:

$$CH_2=CH-(CH_2)_x-CH=CH_2$$

in which x is a whole number from 1 to 25; said copolymer containing, in moles, from 99 to 99.99% of said monomer composition based on vinyl chloride and correspondingly from 0.01 to 1% of said polyfunctional compound.

2. The copolymer of claim 1, said copolymer containing, in moles, from 99.5 to 99.99% of said monomer composition based on vinyl chloride and correspondly from 0.01 to 0.5% of said polyfunctional compound.

3. The copoylmer of claim 1 or 2, wherein the vinyl chloride monomer composition contains at least 50% vinyl chloride monomer and the polyfuncitonal compound is 1,9-decadiene.

* * * * *

UNITED STATES PATENT AND TRADEMARK OFFICE
CERTIFICATE OF CORRECTION

PATENT NO. : 4,835,236

DATED : May 30, 1989

INVENTOR(S) : Grossoleil et al.

It is certified that error appears in the above-identified patent and that said Letters Patent is hereby corrected as shown below:

Column 1, line 42, delete the word "invetion" and insert --invention--;

line 64, delete the word "compostion" and insert --composition;

line 66, delete the word "vinly" and insert --vinyl--;

line 67, delete the word "exclusuive" and insert --exclusive--.

Column 2, line 2, delete the word "empolyed" and insert --employed--;

lines 12 and 13 delete the word "inventon" and insert --invention--;

line 14, delete the word "compositon" and insert --composition--;

line 19, delete the word "vinly" and insert --vinyl--;

line 29, delete the word "inventoin" and insert --invention--;

UNITED STATES PATENT AND TRADEMARK OFFICE
CERTIFICATE OF CORRECTION

PATENT NO. : 4,835,236

DATED : May 30, 1989

INVENTOR(S) : Grossoleil et al.

It is certified that error appears in the above-identified patent and that said Letters Patent is hereby corrected as shown below:

line 33, delete the word "temperture" and insert --temperature--;

line 63, delete the word "polymerizatoin" and insert --polymerization--;

line 68, delete the word "vinly" and insert --vinyl--.

Column 3, line 1, delete the word "is" and insert --in--;

line 3, delete the word "expecially" and insert --especially--;

same line delete the word "polymersization" and insert --polymerization--;

line 21, delete the word "Afther" and insert --After--;

line 38, delete the word "isobuty" and insert --isobutyl--;

line 43, delete the word "initiatiors" and insert --initiators--;

line 53, delete the word "mes" and insert --mesh--;

UNITED STATES PATENT AND TRADEMARK OFFICE
CERTIFICATE OF CORRECTION

PATENT NO. : 4,835,236

DATED : May 30, 1989

INVENTOR(S) : Grossoleil et al.

It is certified that error appears in the above-identified patent and that said Letters Patent is hereby corrected as shown below:

line 61, delete the word "emonomer" and insert --monomer--;

line 64, delete the word "compositon" and insert --composition--.

Column 4, line 10, delete the word "acetylcyclhohexanesulfonyl" and insert --acetylcyclohexanesulfonyl--;

line 13, delete the word "peroxdicarbonate" and insert --peroxydicarbonate--;

line 17, delete the word "propoinate." and insert --propionate.--;

line 19, delete the word "initiatiors" and insert --initiators--.

line 45, "In" and the remainder of the sentence that follows should be a separate paragraph.

Column 5, line 15, delete the word "EXAMPLE" and insert --EXAMPLES--;

line 16, delete the word "or" and insert --of--.

UNITED STATES PATENT AND TRADEMARK OFFICE
CERTIFICATE OF CORRECTION

PATENT NO. : 4,835,236

DATED : May 30, 1989

INVENTOR(S) : Grossoleil et al.

Page 4 of 5

It is certified that error appears in the above-identified patent and that said Letters Patent is hereby corrected as shown below:

Column 6, line 23, delete the word "fo" and insert --of--.

Column 7, line 40, delete the word "caacity" and insert --capacity--.

Column 8, line 18, delete the word "acetylcyclhoexane-sulfonyl" and insert -- acetycyclohexane-sulfonyl --.

line 39, delete the word "producy" and insert --product--.

Column 9, line 4, delete the word "compond" and insert --compound--.

Column 3, line 23, delete the word "degasifing" and insert --degasifying--;

line 40, delete the word "ter." and insert --tert.--;

UNITED STATES PATENT AND TRADEMARK OFFICE
CERTIFICATE OF CORRECTION

PATENT NO. : 4,835,236

DATED : May 30, 1989

INVENTOR(S) : Grossoleil et al.

It is certified that error appears in the above-identified patent and that said Letters Patent is hereby corrected as shown below:

Column 10, line 5, delete the word "correspondly" and insert

-- correspondingly --.

Signed and Sealed this

Thirteenth Day of March, 1990

Attest:

JEFFREY M. SAMUELS

*Attesting Officer*  *Acting Commissioner of Patents and Trademarks*